(12) United States Patent
Van Der Made et al.

(10) Patent No.: US 12,103,258 B2
(45) Date of Patent: Oct. 1, 2024

(54) TIRE BUILDING METHOD AND TIRE BUILDING SYSTEM, IN PARTICULAR FOR STRIP-WINDING

(71) Applicant: VMI HOLLAND B.V., Epe (NL)

(72) Inventors: Maarten Reinoud Van Der Made, Epe (NL); Cees Johan Van Voskuilen, Epe (NL); Gerrit Mulder, Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 16/973,379

(22) PCT Filed: Jun. 7, 2019

(86) PCT No.: PCT/NL2019/050346
§ 371 (c)(1),
(2) Date: Dec. 8, 2020

(87) PCT Pub. No.: WO2019/235932
PCT Pub. Date: Dec. 12, 2019

(65) Prior Publication Data
US 2021/0245465 A1    Aug. 12, 2021

(30) Foreign Application Priority Data
Jun. 8, 2018 (NL) .................................. 2021086

(51) Int. Cl.
*B29D 30/30*    (2006.01)
*B29D 30/00*    (2006.01)
*B29D 30/08*    (2006.01)

(52) U.S. Cl.
CPC .. *B29D 30/3028* (2013.01); *B29D 2030/0066* (2013.01); *B29D 2030/082* (2013.01); *B29D 2030/3064* (2013.01)

(58) Field of Classification Search
CPC .... B29D 30/0061; B29D 30/08; B29D 30/16; B29D 30/1621; B29D 30/1628;
(Continued)

(56) References Cited

U.S. PATENT DOCUMENTS 6,039,826 A * 3/2000 Okada ................ B29D 30/3028
                                                  156/117
10,369,758 B2   8/2019 Boffa et al. ........ B29D 30/0061
(Continued)

FOREIGN PATENT DOCUMENTS

CN    102778203    11/2012    ............. G01B 11/06
CN    106457710     2/2017    ............. B29D 30/00
(Continued)

OTHER PUBLICATIONS

Okada N, JP-10296876-A, machine translation. (Year: 1998).*
(Continued)

*Primary Examiner* — Sedef E Paquette
(74) *Attorney, Agent, or Firm* — HAYES SOLOWAY P.C.

(57) ABSTRACT

A tire building method, in particular for strip-winding, includes the step of:
  providing a choice between a production mode for building a tire component and a test mode for obtaining test measurements, wherein the choice is provided prior to executing the test mode;
  wherein at least one or more building parameters is set prior to the building of the tire component based on test measurements performed on a test strip during the test mode.
Also disclosed is a tyre building system and a measurement tool.

21 Claims, 8 Drawing Sheets

(58) Field of Classification Search
CPC ............... B29D 30/30; B29D 30/3021; B29D 30/3028; B29D 2030/0066; B29D 2030/082; B29D 2030/3064; B29D 30/60; G01B 21/20; G01B 11/24
USPC .......................................................... 156/117
See application file for complete search history.

(56) References Cited

U.S. PATENT DOCUMENTS

| | | | |
|---|---|---|---|
| 10,967,591 | B2 | 4/2021 | Bouchereau et al. . B29D 30/16 |
| 2007/0023122 | A1 | 1/2007 | Moriguchi et al. ............. 156/64 |
| 2007/0084541 | A1 | 4/2007 | Moriguchi et al. ........... 156/117 |
| 2017/0120549 | A1* | 5/2017 | Boffa ................. B29D 30/0061 |
| 2019/0184662 | A1 | 6/2019 | Watanabe et al. ..... B29D 30/30 |
| 2019/0184663 | A1 | 6/2019 | Yagi ....................... B29D 30/30 |

FOREIGN PATENT DOCUMENTS

| | | | |
|---|---|---|---|
| DE | 25 07 726 | 9/1976 | ............ B29H 17/20 |
| EP | 2 338 655 | 6/2011 | ............... B29B 7/32 |
| FR | 3 051 388 | 11/2017 | ............ B29D 30/30 |
| JP | 10-296875 | 11/1998 | ............ B29D 30/60 |
| JP | 10296876 A * | 11/1998 | ........ B29D 30/3028 |
| JP | 2004-299184 | 10/2004 | ............ B29D 30/10 |
| JP | 2007-106090 | 4/2007 | ............ B29D 30/60 |
| JP | 2015-3503 | 1/2015 | ............ B29D 30/26 |
| JP | 2017-127986 | 7/2017 | ............ B29D 30/30 |
| RU | 2324594 | 5/2008 | ............ B26D 30/08 |
| WO | WO2009057057 | 5/2009 | ............ B29D 30/16 |
| WO | 2015/150970 | 10/2015 | ............ B29D 30/16 |
| WO | 2016/122311 | 8/2016 | |
| WO | 2017/198465 | 11/2017 | ............ B29D 30/16 |
| WO | 2018/100501 | 6/2018 | ............ B29D 30/06 |

OTHER PUBLICATIONS

Office Action issued in Japan Patent Appln. 2019-568711, dated Mar. 2, 2021, English translation, 6 pages.
Decision to Grant issued in Japan Patent Appln. Serial No. 2019-568711, dated Jul. 6, 2021, with English translation, 5 pages.
International Search Report and Written Opinion issued in PCT/NL2019/050346, dated Sep. 18, 2019, 11 pages.
International Preliminary Report on Patentability issued in PCT/NL2019/050346, dated Dec. 8, 2020, 7 pages.
First Office Action issued in Chinese Patent Appln. Serial No. 201980038562.6, dated Dec. 17, 2021, with English translation, 10 pages.
Indian Official Action issued in related application 202027051805, dated Jul. 14, 2022, 5 pages.
Russian Decision to Grant issued in related application 2020142768, dated Nov. 29, 2022, 11 pages.

* cited by examiner

TIRE BUILDING METHOD AND TIRE BUILDING SYSTEM, IN PARTICULAR FOR STRIP-WINDING

BACKGROUND

The invention relates to a tire building method and tire building system, in particular for strip-winding.

JP 2004-299184 A discloses that conventionally, profile measurement of the profile, i.e. the external shape, of the molded tire was performed after completion of tire molding. However, judging the molding quality takes time, and as a result, the molding process is prolonged. Also, in the conventional profile measurement, it was impossible to know the quality of molding during the winding. As a result, the material and the working time are wasted in case it is determined after completion of tire forming that a quality problem occurred.

To address the aforementioned issues, JP 2004-299184 A discloses a profile measurement instrument with a displacement sensor that is arranged in the vicinity of the extrusion nozzle to immediately measure the accumulated profile as the strip is being wound and the profile is being built by laminating layer onto layer. By simultaneously measuring the rotation position of the drum and the traversing position of the nozzle, a calculation unit can accurately calculate the accumulating profile in real time from the start of molding to the completion of molding. Hence, any quality problems can be detected during the molding instead of after completion of the molding.

WO 2017/198465 A1 discloses a tire manufacturing system for controlling a product profile having one or more elastomeric layers that are produced by continuously extruding a strip. The strip is spirally deposited around a forming surface such that the adjacent strip edges do not overlap. The circumference of each layer is measured during deposition of that layer and compared with a predicted threshold value. The process may include terminating the deposition cycle in advance of subsequent deposition of another layer upon an indication of non-equivalence when comparing the detected value with a target circumferential value. The process parameter is then adjusted and repeated during successive deposition cycles to ensure that the circumference of any product profile realizes the predicted value.

SUMMARY OF THE INVENTION

A disadvantage of the known measurement instruments according to JP 2004-299184 A and WO 2017/198465 A1 is that they merely provide real-time quality control on the accumulated profile that is being formed during production. If a quality problem occurs at or near the end of the tire molding, the material and the working time are again wasted and the solution is no better than the conventional profile measurement. Although such a terminated production cycle may be qualified as a test run, it is clear that the initial intention of the production cycle was to obtain a finished product. Hence, the parameters and values that were used correspond to the profile that was being built. The operator may trial-and-error by slightly adjusting different parameters based on the terminated production cycle, but has to wait for the tire molding to reach the same stage where the quality problem previously occurred to determine if the quality has indeed improved. In addition, when switching over to a new batch of raw material or a different type of tire component, new quality problems may occur in different areas of the tire molding and the trial-and-error process starts all over.

Hence, the solutions as disclosed in JP 2004-299184 A and WO 2017/198465 A1 fail to provide proper feedback that allows an operator to predict the behavior of the strip during the subsequent tire molding and take action to prevent quality problems from occurring in the first place.

It is an object of the present invention to provide a tire building system and a method, in particular for strip-winding, wherein the quality of the tire building can be improved.

According to a first aspect, the invention provides a tire building method comprising the step of:
providing a choice between a production mode for building a tire component and a test mode for obtaining test measurements, wherein the choice is provided prior to executing the test mode;
wherein the test mode comprises the steps of:
providing a cylindrical measurement surface extending concentrically about a central axis;
helically winding a continuous test strip in a plurality of windings about said central axis onto the cylindrical measurement surface, wherein one or more windings of the plurality of windings of the test strip has a pitch in an axial direction parallel to the central axis that is greater than a width of the test strip in the same axial direction in said one or more windings; and
obtaining test measurements from at least one of the windings of the one or more windings of the test strip;
wherein the production mode comprises the step of:
building a tire component from a production strip on a production surface using one or more building parameters;
wherein the method further comprises the steps of first executing the test mode and then executing the production mode, wherein at least one of the one or more building parameters is set prior to the building of the tire component based on the test measurements of the test strip.

The helical winding of the one or more windings of the test strip at the specified pitch results in said one or more windings being separated or spaced apart in the axial direction from the directly consecutive windings. In other words the one or more windings can be applied in a non-overlapping manner onto the cylindrical measurement surface. Hence, the measurements that are obtained from the one or more windings of the test strip can provide accurate feedback to the operator about the measurements and/or characteristics of said test strip derived from said measurements in the individual windings. Choosing to initiate a test mode instead of a production mode has the advantage that said test mode is not restricted to the parameters and/or values used in the production mode. Instead, a large variety of building parameters and/or a large range of values for one or more building parameter can be tested on individual windings of the same test strip to provide a large amount of measurements. This large amount of feedback can be used to more accurately predict the behavior of the production strip during the production mode. The measurements can also be used to predict the behavior of the production strip during different production programs, i.e. when switching over to a different type of tire component. In particular, based on a single test mode, an operator may determine, calculate, verify, calibrate and/or adjust the building parameters for the building of one or more types of tire components. Based on the measurements, the operator can ultimately program or set the building parameters to improve the quality of the tire building.

In a preferred embodiment the choice is provided to an operator via a user interface. Hence, the operator can manually choose to select the test mode or the production mode prior to the execution of one of said modes.

In another embodiment the production strip is wound using a first building parameter with a value that is set during the winding of the production strip according to a production sequence based on the position of the production strip within the tire component that is being build, wherein the test strip is wound using the first building parameter with a value that is set during the winding of the test strip according to a test sequence that is independent of the production sequence. In other words, the test sequence is not restricted to the values, building parameters, building programs and/or the order of said building programs. Hence, a test strip can be produced with a large variety of building parameters and/or a large range of values for said building parameters, as said test strip is not intended for production.

In another embodiment the production strip is wound using a first building parameter with production values that all lie within a production value range, wherein the test strip is wound using the first building parameter with at least one test value that lies outside of the production value range. Hence, compared to the production mode, a relatively large amount of measurements can be obtained for values that lie within, but also outside of the normal range that is used during the production mode. This allows for the measurements to be used to set building parameters for different production programs than the one that is currently selected. Hence, the test mode does not have to be performed again for each switchover to a new type of tire component.

In another embodiment a first winding of the one or more windings of the test strip is at least partially wound using a first building parameter set at a first value and a second winding of the one or more windings of the test strip is at least partially wound using the first building parameter set at a second value different from the first value, wherein the method comprises the step of interpolating or extrapolating the test measurements of the test strip for values of the first building parameter in a range between the first value and the second value or outside of a range defined by the first value and the second value, respectively. By interpolating or extrapolating the test measurements, the test measurements can be predicted over a large range without actually obtaining measurements for each value in the range.

Preferably, the test strip obtained during the test mode is not used for building the tire component or a part thereof in the production mode. Again, because the test strip is not used in the production mode, the building parameters and/or the values thereof can be varied greatly independently of the production mode.

In a further embodiment a first winding of the one or more windings of the test strip is at least partially wound using a first building parameter set at a first value and a second winding of the one or more windings of the test strip is at least partially wound using the first building parameter set at a second value different from the first value, the first winding, the second winding or both are at least partially wound using a second building parameter, different from the first building parameter, set at a third value, wherein a third winding of the one or more windings of the test strip is at least partially wound using the second building parameter set at a fourth value different from the third value. By comparing the measurements of the first winding, the second winding or both with the measurements of the third winding, the effect of the change from the third value to the fourth value can be assessed and used to predict the behavior of the building strip when setting the second building parameter.

Alternatively, the building parameters are kept constant for all windings of the plurality of windings of the test strip, wherein at least one of the one or more building parameters is adjusted in the production mode to compensate for a change in the test measurements over time. The test strip may start to behave differently over time, e.g. because the test strip starts to cure. The test measurements can provide feedback to the operator on the effect of these changes over time on the test strip, to enable the operator to adjust one or more of the building parameters to compensate accordingly.

In another embodiment the one or more windings of the test strip includes the initial winding of the test strip onto the cylindrical measurement surface during a startup phase of the helical winding of the test strip, wherein the test measurements include measurements of a start of the initial winding onto the cylindrical measurement surface. Additionally or alternatively, the one or more windings of the test strip includes the last winding of the test strip on the cylindrical measurement surface during an end phase of the helical winding of the test strip, wherein the test measurements include measurements of a termination of the last winding on the cylindrical measurement surface. At the start of the winding, the test strip may behave differently, e.g. as a result of the start-up of an extruder or as a result of the application of the leading end of the test strip onto the measurement surface. At the end of the last winding, the test strip may behave differently, e.g. as a result of a cutting or tearing off of the test strip. The test measurements can provide feedback to the operator on the behavior of the test strip during the start of the initial winding or during the termination at the last winding, which feedback can be used to adjust one or more of the building parameters to compensate accordingly.

In a further embodiment the plurality of windings are wound in a single layer around the cylindrical measurement surface, wherein the test mode is terminated after completing the single layer. By winding the test strip in a single layer, each winding is visible and can be measured from the outside.

In a further embodiment the cylindrical measurement surface is the production surface, wherein the method comprises the step of removing the test strip from the measurement surface prior to the building of the tire component in the production mode. As the production surface and the measurement surface are the same, the behavior of the test strip on the measurement surface corresponds to the behavior of the production strip on the production surface. Hence, the test measurements of the test strip can be used as reliable feedback for predicting the behavior of the production strip on the production surface.

Alternatively, the production surface is a cylindrical production surface, wherein the method comprises the steps of fitting a measurement tool around the cylindrical production surface prior to the helical winding of the test strip and removing the measurement tool from the production surface after completion of the helical winding of the test strip and prior to the building of the tire component, wherein the cylindrical measurement surface is formed by the measurement tool and extends concentrically about the central axis when the measurement tool is fitted around the cylindrical production surface. The cylindrical production surface may not be optimized for obtaining measurements. E.g. the contrast may be too low to allow for optical measurements, the production surface may not be smooth enough or may not be perfectly circular. In some applications, the production surface contains slits or gaps that allow ingress of the material of the test strip. To obtain more reliable and/or more consistent test measurements, the measurement surface can be provided on the measurement tool which extends around the production surface. Preferably, the external diameter of the measurement surface on the measurement tool is as close as possible to the external diameter of the production surface so that the effect of the diameter increase at the measurement tool is minimized and/or negligible.

In another alternative embodiment, the production surface is a cylindrical production surface, wherein the cylindrical measurement surface and the cylindrical production surface are offset with respect to each other in the axial direction. By providing the measurement surface axially on the side of the production surface, the building of the tire component is independent of and/or not delayed by the removal of the measurement tool according to the previous embodiment or the removal of the test strip from the production surface in the embodiment before that.

In each of the previous embodiment that features the cylindrical production surface, the tire component can be built by helically winding the production strip in a plurality of windings onto the production surface. As both the test strip and the production strip are wound, the test measurements of the test strip can provide useful feedback for predicting the behavior of the production strip in similar windings.

Preferably, the plurality of windings of the production strip have a pitch in the axial direction that is smaller than the width of the production strip in the same axial direction. Consequently, in contrast to the test strip, the windings of the production strip are arranged in an overlapping manner to build the tire component from the windings of said production strip.

More preferably, the pitch of the one or more windings of the test strip is at least one-and-a-half times or two times greater than the largest pitch of the helical windings of the production strip. Hence, the windings of the test strip can be sufficiently spaced apart to allow for the test measurements to be obtained for each individual winding.

In another embodiment the pitch of the one or more windings of the test strip is constant. Consequently, the windings can be equally spaced apart and/or the windings can be positioned at known positions or intervals.

According to a second aspect, the invention provides a tire building system comprising a strip supply member for supplying a continuous test strip, a cylindrical measurement surface for receiving said test strip from the strip supply member, a rotational drive for rotating the cylindrical measurement surface about a central axis concentric to said cylindrical measurement surface and a pitch drive for providing a relative displacement between the cylindrical measurement surface and the supply member in an axial direction parallel to the central axis, wherein the tire building system further comprises a control unit that is switchable between a test mode in which the rotational drive and the pitch drive are controlled such that the test strip is wound helically onto the cylindrical measurement surface in a plurality of windings about the central axis with a pitch in the axial direction and a production mode in which a tire component is built from a production strip on a production surface using one or more building parameters, wherein the supply member comprises a die with a die opening for shaping the test strip, wherein the die opening has a die width that defines the width of the test strip, wherein the control unit is arranged to control the rotational drive and the pitch drive such that the pitch of one or more windings of the plurality of windings of the test strip in the axial direction is greater than the die width, wherein the tire building system further comprises a sensor for obtaining test measurements from the one or more windings of the test strip on the cylindrical measurement surface, wherein the control unit is arranged for providing a choice between the test mode and the production mode prior to executing the test mode and, after completing the test mode and prior to the building of the tire building, using the test measurements to set at least one of the one or more building parameters based on the test measurements of the test strip.

The control unit of the tire building system is arranged for providing the same choice as in the aforementioned method according to the first aspect of the invention and thus has the same technical advantages.

In a preferred embodiment the tire building system comprises a user interface that is operationally connected to the control unit, wherein the control unit is arranged for controlling the user interface to provide the choice to an operator.

In another preferred embodiment the tire building system comprises a memory that is operationally connected to the control unit, wherein the memory is loaded with a production sequence and a test sequence, wherein the production strip is wound using a first building parameter with a value that is set during the winding of the production strip according to the production sequence based on the position of the production strip within the tire component that is being build, wherein the test strip is wound using the first building parameter with a value that is set during the winding of the test strip according to the test sequence that is independent of the production sequence.

Preferably, the pitch of the one or more windings of the test strip is at least one-and-a-half times or two times greater than the die width. Preferably, the tire building system comprises a drum with a drum shaft and a plurality of segments which are movable in a radial direction perpendicular to the drum shaft, wherein the plurality of segments form the production surface. In one embodiment the cylindrical measurement surface is the production surface. As the production surface and the measurement surface are the same, the behavior of the test strip on the measurement surface corresponds to the behavior of the production strip on the production surface.

In an alternative embodiment the production surface is a cylindrical production surface, wherein the tire building system further comprises a measurement tool that is arranged to fit around the cylindrical production surface, wherein the cylindrical measurement surface is formed by the measurement tool and extends concentrically about the cylindrical production surface when the measurement tool is fitted around the cylindrical production surface.

Preferably, the cylindrical measurement surface is more circular than the cylindrical production surface, and preferably approximates or forms a perfect circle. In a further alternative embodiment the production surface is a cylindrical production surface, wherein the cylindrical measurement surface and the cylindrical production surface are offset with respect to each other in the axial direction. In another embodiment the control unit is arranged for controlling the rotational drive and the pitch drive in the production mode such that the production strip is wound helically in a plurality of windings with a pitch in the axial direction onto the production surface, wherein the plurality of windings of the production strip have a pitch in the axial direction that is smaller than the die width. The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1-4 show a tire building system 1, in particular for strip-winding, according to an exemplary first embodiment of the invention.

Figure 1:
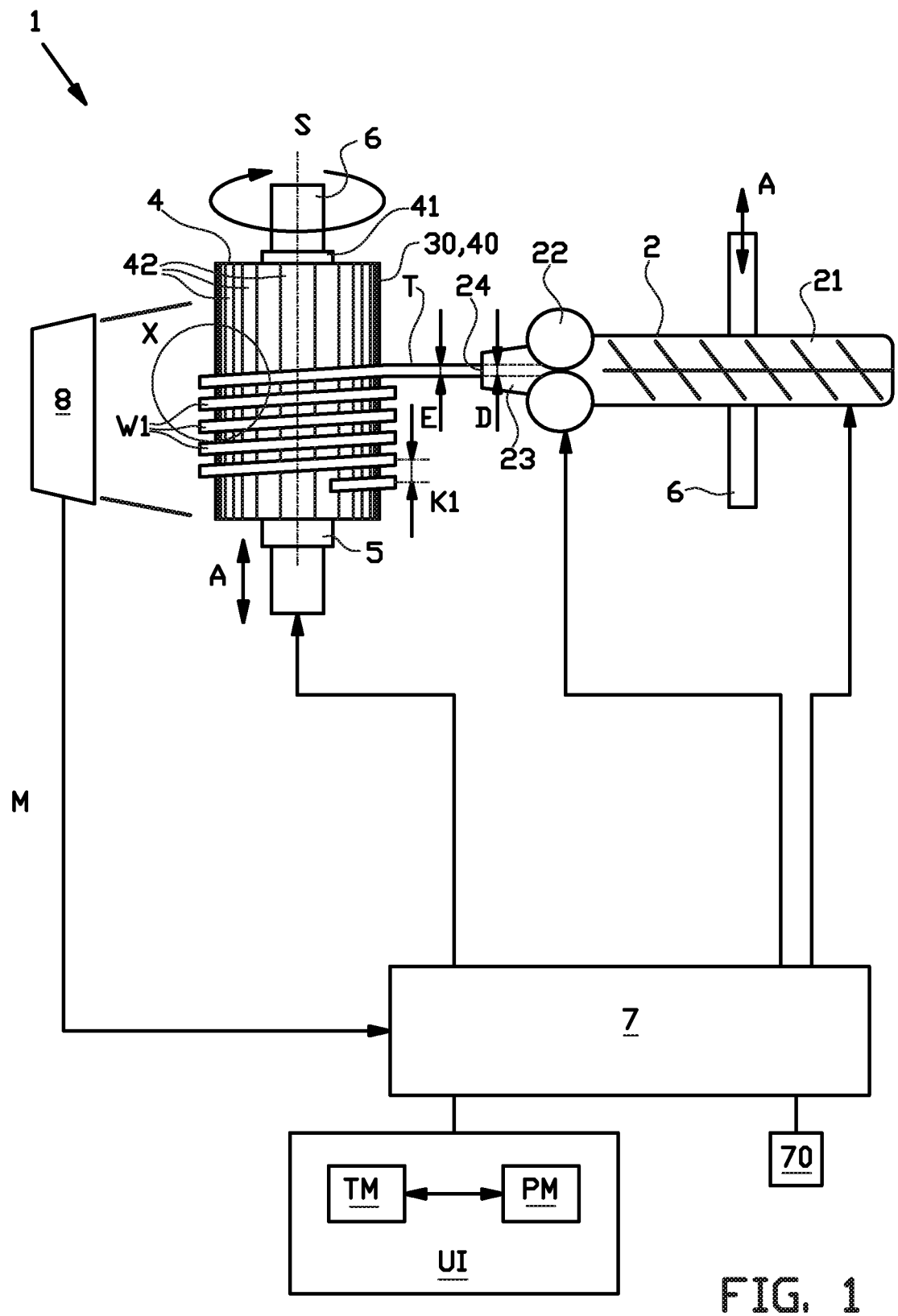
FIG. 1 shows a top view of a tire building system according to a first embodiment of the invention during a test mode.

As shown in FIG. 1, the tire building system 1 comprises a strip supply member 2 that is arranged for supplying a continuous test strip T in a test mode TM. In this exemplary embodiment, the strip supply member 2 comprises an extruder 21 and a gear pump 22. The strip supply member 2 is further comprises a die 23 with a die opening 24 for shaping the test strip T. Said die opening 24 has a die width D that defines the strip width E of the test strip T. The tire building system 1 further comprises a cylindrical measurement surface 30 for receiving said test strip T from the strip supply member 2 in the test mode TM.

Figure 2:
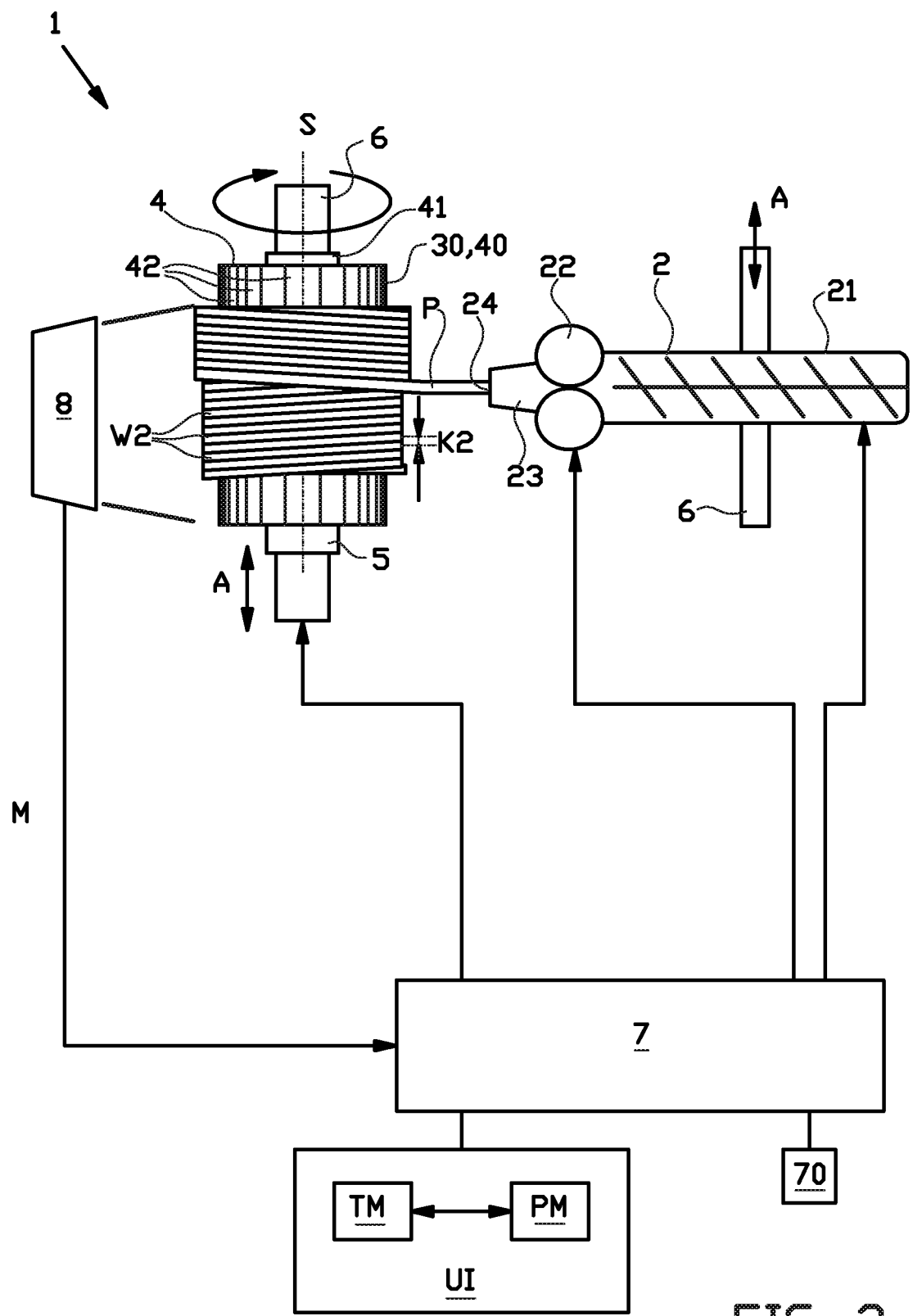
FIG. 2 shows a top view of the tire building system of FIG. 1 during a production mode.
Figure 3:
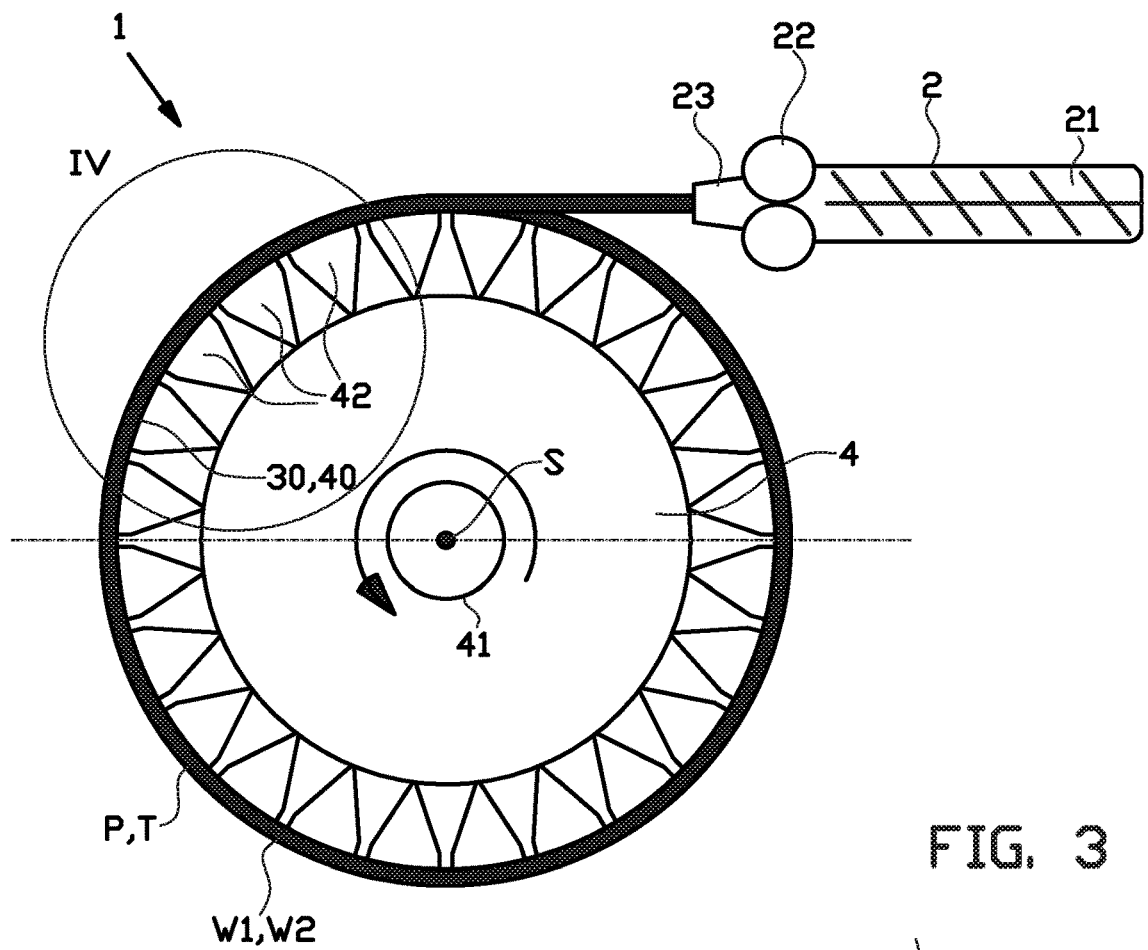
FIG. 3 shows a side view of the tire building system according to FIG. 1.
Figure 4:
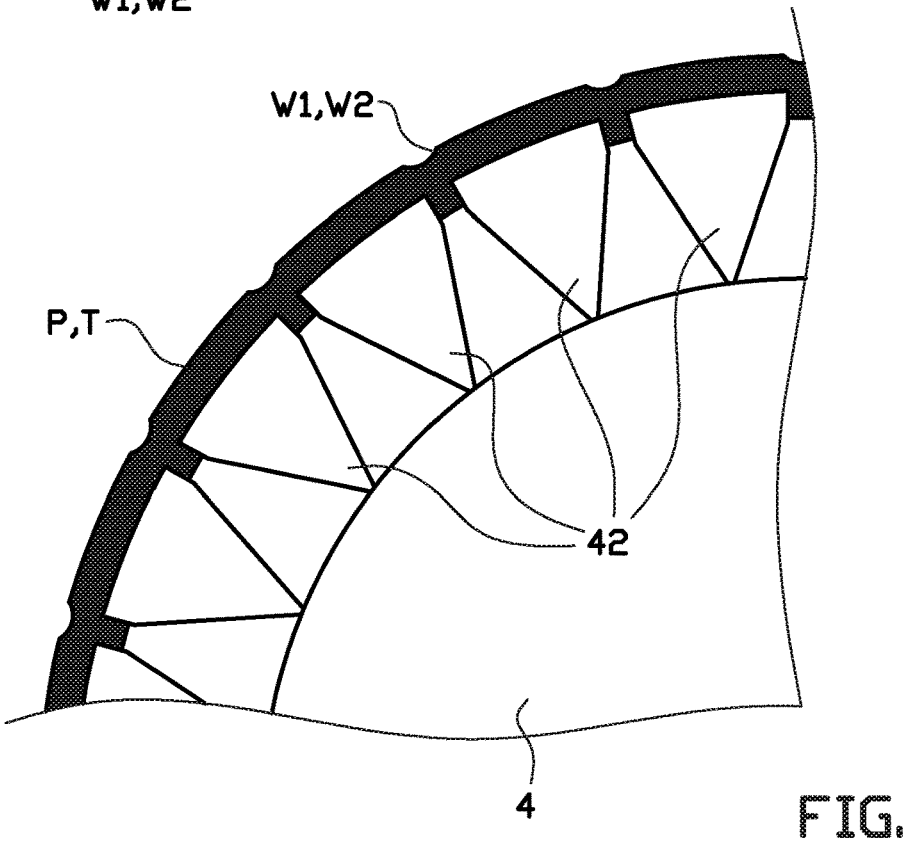
FIG. 4 shows a detail of the tire building system according to circle IV in FIG. 3.
Figure 5:
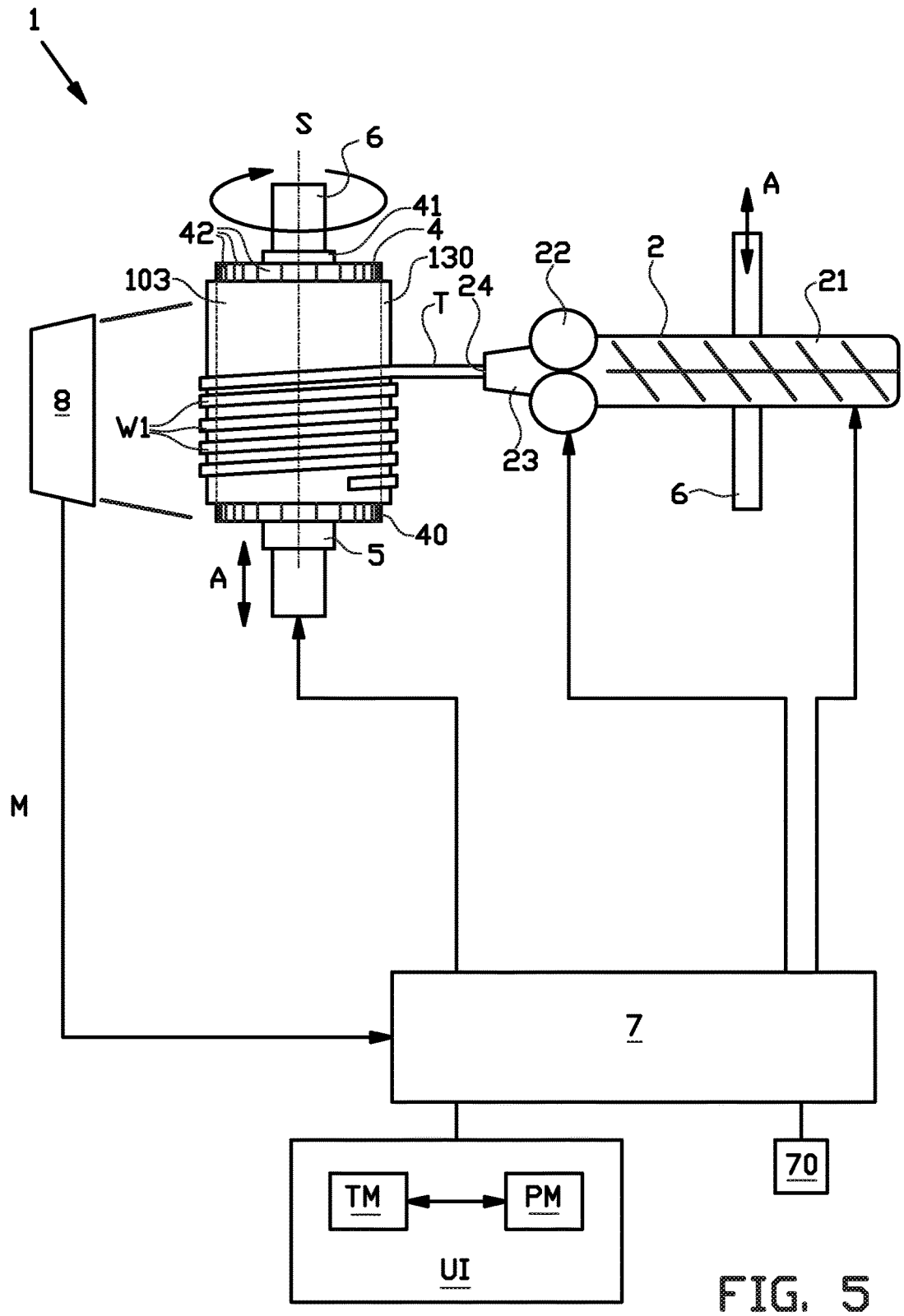
FIG. 5 shows a top view of an alternative tire building system according to a second embodiment of the invention.
Figure 6:
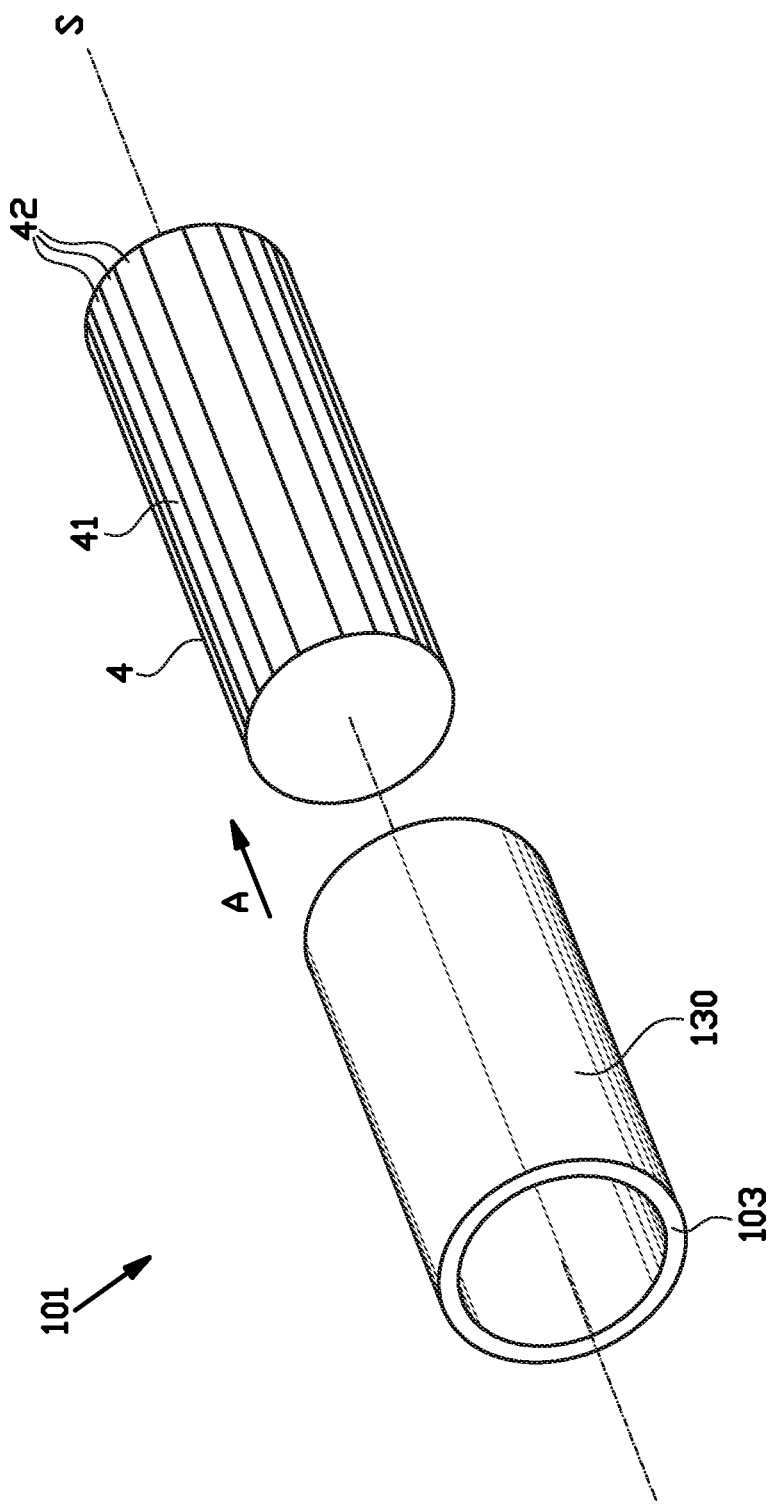
FIG. 6 shows an isometric view of the alternative tire building system according to FIG. 5.
Figure 7:
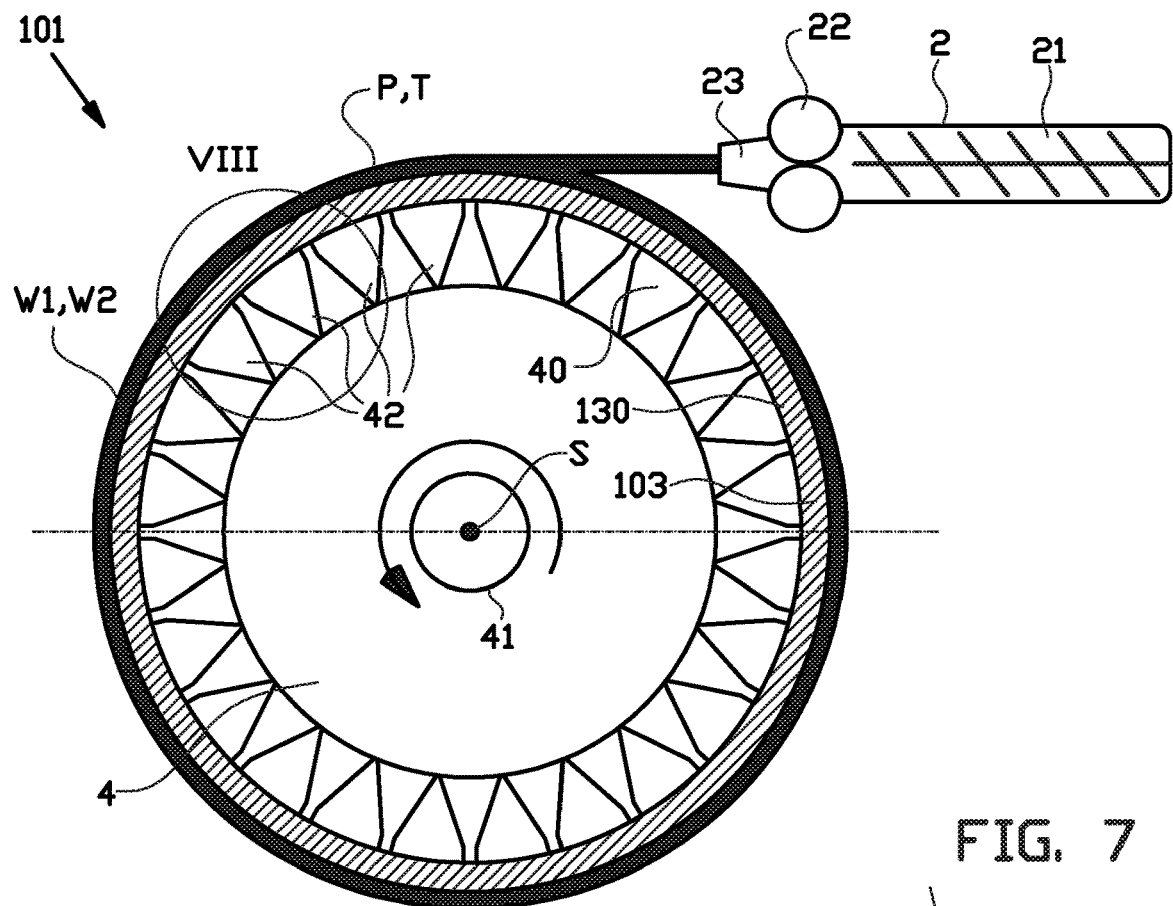
FIG. 7 shows a side view of the alternative tire building system according to FIG. 5.
Figure 8:
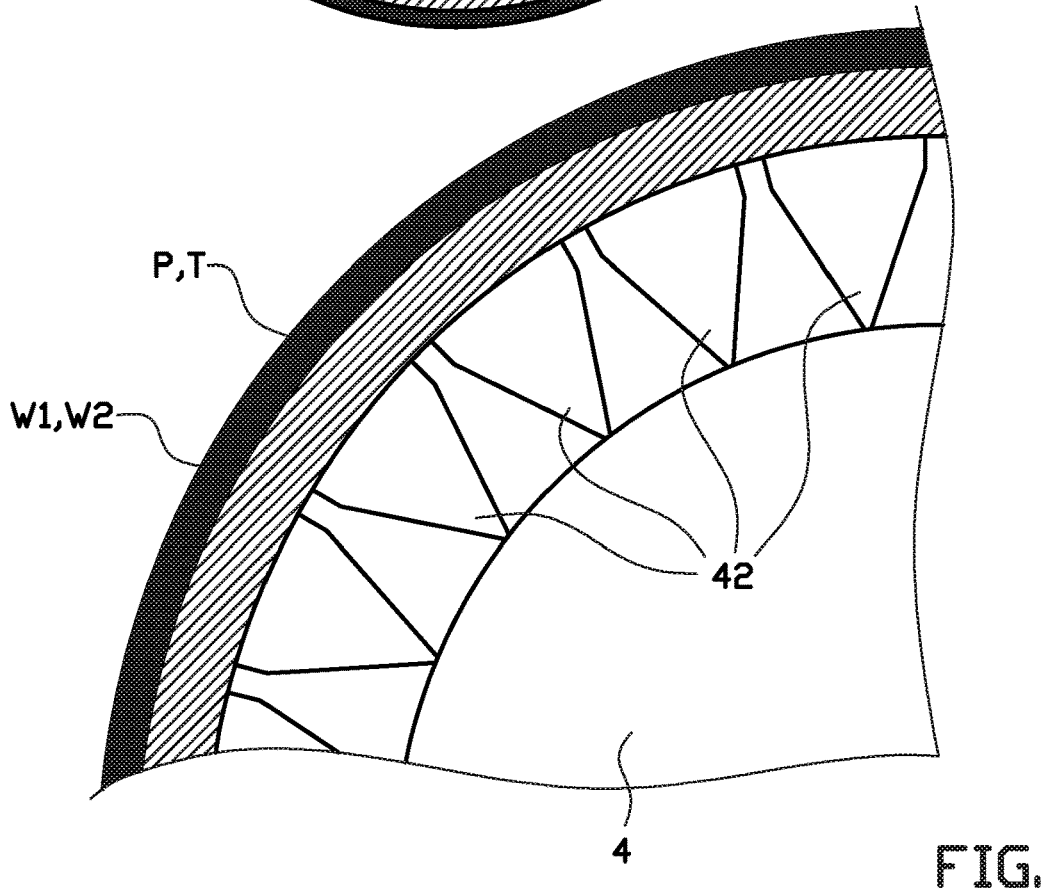
FIG. 8 shows a detail of the alternative tire building system according to circle VIII in FIG. 7.

As shown in FIG. 2, the strip supply member 2 is arranged for supplying a continuous production strip P in a production mode PM. The tire building system 1 is provided with a drum 4, in particular a strip-winding drum, with a cylindrical production surface 40 for receiving the continuous production strip P from the strip supply member 2 in the production mode PM. The drum 4 is arranged to be mounted on a drum shaft 41 that extends along the central axis S in the axial direction A. The drum 4 comprises a plurality of segments 42 which are movable in a radial direction perpendicular to the drum shaft 41 and/or the central axis S to vary the diameter of the drum 4. At each diameter of the drum 4, the segments 42 form a circumferential surface that approximates a cylinder. Said circumferential surface forms the production surface 40. The segments 42 may not be able to form a perfectly cylindrical or circular production surface 40 at each diameter of the drum 4. In particular, the production surface 40 may be slightly irregular and/or polygonal. Moreover, there may be small slits or gaps between the segments 42 that allow the ingress of material of the production strip P between the segments 42, as schematically shown in FIG. 4.

In this exemplary embodiment, the cylindrical production surface 40 also forms the cylindrical measurement surface 30. Hence, the test strip T and the production strip P are received on the same cylindrical surface 30, 40, yet during different modes of the tire building system 1.

As shown in FIGS. 1 and 2, the tire building system 1 is provided with a rotational drive 5 for rotating the drum 4, and thus the cylindrical production surface 40 and the cylindrical measurement surface 30, about a central axis S concentric to said cylindrical measurement surface 4. The tire building system 1 is further provided with a pitch drive 6 for providing a relative displacement between the drum 4 and the supply member 2 in an axial direction A parallel to the central axis S. The pitch drive 6 may be arranged for moving the supply member 2, the drum 4 or both.

The tire building system 1 also comprises a control unit 7 that is arranged to operate the tire building system 1 in the test mode TM and the production mode PM. The tire building system 1 further comprises a user interface UI that is operationally connected to the control unit 7. The control unit 7 controls the user interface UI to provide the operator with a choice between the test mode TM and the production PM prior to the execution of one of said modes TM, PM. The tire building system 1 further comprises a memory 70 that is operationally connected to the control unit 7. The memory 70 is loaded with a test program or a test sequence, i.e. a series of instructions in a predetermined order, for executing the test mode TM and a production program or a production sequence, i.e. a series of instructions in a predetermined order, for executing the production mode. The test sequence is independent of or unrelated to the production sequence. In other words, the order of the instructions, the content of the instructions and/or the type of instructions in the test sequence may be different or completely different than those used in the production sequence.

Figure 10:
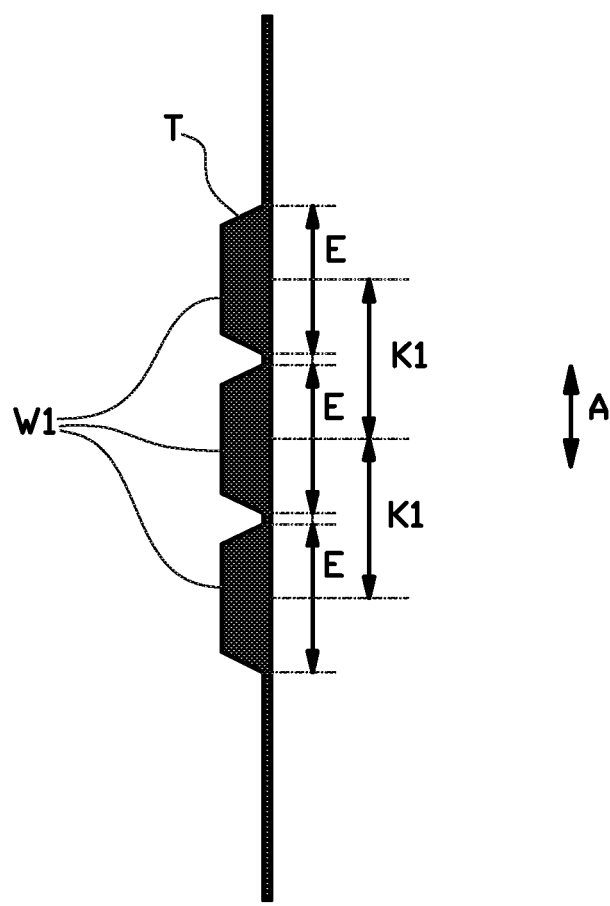
FIG. 10 shows a detail of a test strip formed on a measurement surface of the tire building system according to circle X in FIG. 1.

The control unit 7 is operationally and/or electronically connected to the rotation drive 5 and the pitch drive 6. In particular, the control unit 7 is arranged to control the rotational drive 5 and the pitch drive 6 in the test mode TM such that the test strip T is wound helically in a plurality of windings W1 about the central axis S, as shown in FIG. 1. More in particular, the control unit 7 is arranged for controlling the rotational drive 5 and the pitch drive 6 in the test mode TM such that one or more of the windings W1 of the test strip T are wound with a pitch K1 in the axial direction A that is greater than the die width D and/or the strip width E. Preferably, the pitch K1 of the one or more windings W1 of the test strip T is at least one-and-a-half times or two times greater than the die width D and/or the strip width E. The pitch K1 is the height of a single turn, revolution or winding W1 of the test strip S measured in or parallel to the axial direction A. Three of the windings W1 are shown in more detail in FIG. 10.

By having a pitch K1 that is greater than the die width D and/or the strip width E, each winding of the one or more windings W1 is spaced apart from the directly adjacent windings W1 in the axial direction A. In other words, the one or more windings W1 of the test strip T are laid down in a non-overlapping manner.

In FIG. 1, all windings W1 of the test strip T have a pitch K1 greater than the die width D and/or the strip width E. Preferably, all windings W1 of the one or more windings W1 have a constant pitch K1.

The control unit 7 is further arranged for controlling the rotational drive 5 and the pitch drive 6 such that the windings W1 of the test strip T are laid in a single layer only. Hence, there are no layers of windings W1 of the test strip T overlapping said single layer of windings W1.

Figure 11:
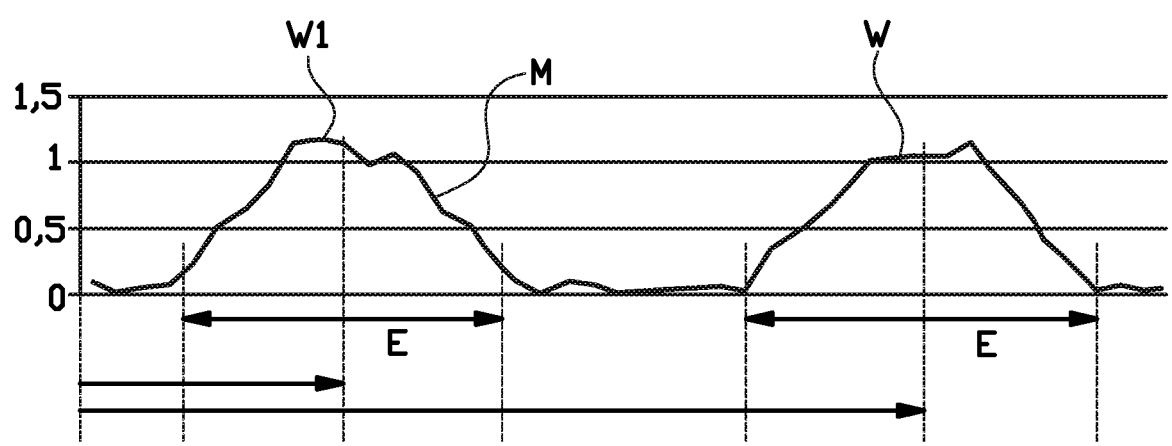
FIG. 11 shows a graph representing test measurements taken of the test strip of FIG. 10.

As shown in FIG. 1, the tire building system 1 further comprises a sensor 8 for obtaining test measurements M, as shown in FIG. 11, from at least one of the one or more windings W1 of the test strip T on the cylindrical measurement surface 30. Preferably, the sensor 8 is arranged to obtain measurements from several windings W1 of the test strip T simultaneously. In particular, the sensor 8 may be part of an optical or laser triangulation system with a field of view that extends along the width of several windings W1 on the measurement surface 30. The sensor 8 is arranged for obtaining test measurements M, including positional data on the windings W1, such as height or width, as shown in FIG. 11.

The control unit 7 is operationally and/or electronically connected to the sensor 8 to receive and/or process the test measurements M from the sensor 8. The control unit 7 may for example calculate the volume or cross sectional area of the windings W from the measured height and width.

The control unit 7 is arranged for switching the tire building system 1 from the test mode TM into the production mode PM. In the production mode PM, the control unit 7 is arranged to control the rotational drive 5 and the pitch drive 6 such that the production strip P is wound helically in a plurality of windings W2 about the central axis S, as shown in FIG. 2, to build or construct a tire component (not shown) by strip-winding. More in particular, the control unit 7 is arranged for controlling the rotational drive 5 and the pitch drive 6 in the production mode PM such that one or more of the windings W2 of the production strip P are wound with a pitch K2 in the axial direction A that is smaller than the die width D and/or the strip width E. Consequently, the windings W2 of the production strip P are wound in an overlapping manner, i.e. without spacing between the directly adjacent windings W2. Moreover, the windings W2 of the production strip P are laminated in several layers to construct a tire component with a thickness greater than the thickness of the individual windings W2.

The tire component is constructed on the production surface 40 using one or more building parameters. The building parameters may comprises parameters of the group comprising: a speed, a speed ratio, a flow rate, a temperature, a pressure or an environmental condition, such as humidity or ambient temperature. In this particular example, where the production strip P is extruded by an extruder 21, one of the building parameters may be an extrusion speed, an extrusion flow rate, an extrusion temperature or an extrusion pressure. Also in this particular example where the production strip P is metered by the gear pump 22, one of the building parameters may be a gear pump speed, a gear pump flow rate or a gear pump pressure. Additionally or alternatively, when the production strip P is supplied towards the production surface 40 at a supply speed and the production surface 40 is moved at a receiving speed, one of the building parameters may be the supply speed, the receiving speed or a speed ratio between the supply speed and the receiving speed.

The one or more building parameters may be calculated by the control unit 7 or input by an operator via a user-interface (not shown). The control unit 7 may also propose one or more building parameters which are then reviewed, modified and/or approved by the operator. The control unit 7 is operationally and/or electronically connected to one or more of the supply member 2, the extruder 21, the gear pump 22, the rotational drive 5 and the pitch drive 6 to control one or more of said respective components of the tire building system 1 based on the one or more building parameters.

A tire building method for building a tire component (not shown) will be described in more detail below, with reference to FIGS. 1-4, 10, 11.

The method initially comprises the step of providing the choice between the test mode TM and the production mode PM, as shown schematically in the user interface UI. The choice is provided prior to executing the test mode TM. After the test mode TM has been completed, the production mode PM is initiated.

FIG. 1 shows the test mode TM of the tire building system 1. At the start of the test mode TM, the cylindrical measurement surface 30 is empty. Any residual strips P, T from a previous cycle of the method have been removed. The tire building system 1 is now ready for initiation of the test mode TM.

In FIG. 1, a length of the continuous test strip T has been supplied by the supply member 2 using one or more building parameters which are also used to ultimately supply the production strip P. The control 7 has simultaneously controlled the rotation drive 5 and the pitch drive 6 to helically wind the continuous test strip T in a plurality of windings W1 about the central axis S onto the cylindrical measurement surface 30. The pitch K1 of one or more windings W1 of the plurality of windings W1 is greater than the die width D and/or the strip width E in the axial direction A. During and/or after the winding of the test strip T, the sensor 8 obtains test measurements M from at least one of the windings W1 of the one or more windings W1 of the test strip T, as show in FIG. 11. Said test measurements M can provide useful feedback on how the building parameters used to wind the test strip T affect the characteristics of the windings W1 of said test strip T.

In a preferred application, the test strip T is wound using the first building parameter with at least one test value that lies outside of the production value range. More preferably, test values are used in a range that is considerably greater than that of the production value range. Hence, a relatively large amount of measurements M for a great variety of production scenarios can be generated.

In some applications, it may be useful to wind a first winding W1 of the one or more windings W1 using a first building parameter set at a first value and to wind a second winding W1 of the one or more windings W1 using the first building parameter set at a second value different from the first value. Hence, the test measurements M will provide feedback on how the change in values of the first building parameter affects the measured characteristics of the test strip T.

In a further application, either the first winding W1, the second winding W1 or both are at least partially wound using a second building parameter set at a third value. It can then be advantageous to wind a third winding W1 of the one or more windings W1 using the second building parameter set at a fourth value different from the third value. Again, the test measurements M will provide feedback on how the change in values of the first building parameter affects the measured characteristics of the test strip T.

It will be apparent to one skilled in the art that many more building parameters and values for said building parameters can be tested, limited only by the number of windings W1 of the test strip T that can fit on the cylindrical measurement surface 30. Optionally, different values for the building parameters can be tested within a single winding W1. For example, a single winding W1 may be partially wound using the first building parameter at the first value and partially wound using the first building parameter at the second value.

The control unit 7 is arranged for storing the building parameters and values used for each winding or part of the winding and correlating the stored building parameters and values to the test measurements M obtained by the sensor 8. For this purpose, the tire building system 1 may be provided with one more positional sensors (not shown), e.g. encoders and/or displacement sensors, to accurately detect the positions of the respective components of the tire building system 1 and send signals representative of said positions to the control unit 7.

Alternatively, the building parameters can be kept constant for all windings W1 of the plurality of windings W1 of the test strip T. This may provide useful feedback on how the characteristics of the test strip T change over time, e.g. as a result of curing of the material.

Preferably, the initial winding W1 of the test strip T onto the cylindrical measurement surface 30 is wound using the non-overlapping pitch K1 so that test measurement M may be obtained during a startup phase of the helical winding of the test strip T. Similarly, it is preferred that the last winding W1 of the test strip T on the cylindrical measurement surface 30 is wound using the non-overlapping pitch K1 so that the test measurements T may include the termination of the last winding W1 on the cylindrical measurement surface 30 during an end phase of the helical winding.

The test measurements M are sent to the control unit 7 for processing. The control unit 7 may convert the raw data from the test measurements M into a graphical representation, e.g. similar to the graph shown in FIG. 11, to provide useful feedback to the operator. Alternatively, the raw data from the test measurements M may be provided directly to the operator. In another possible embodiment, the control unit 7 may perform calculations on the data from the test measurements M, e.g. to derive a cross sectional area or volume of the test strip T from the measured height and width. The control unit 7 may also be arranged for interpolating the test measurements M of the test strip T for values of the first building parameter in a range between the first value and the second value; or extrapolating the test measurements M of the test strip T for values of the first building parameter outside a range defined by the first value and the second value.

FIG. 2 shows the production mode PM of the tire building system 1. The test strip T is or can not be used in the production mode PM because of the great variety of building parameters and/or values used in the test mode TM. Hence, in the production mode PM, the test strip T from the test mode TM has been removed from the cylindrical measurement surface 30, which in this example also forms the production surface 40. Subsequently, a tire component (not shown) is build using one or more building parameters.

Prior to switching from the test mode TM, as shown in FIG. 1, to the production mode PM, as shown in FIG. 2, the control unit 7 and/or the operator sets one or more of the building parameters. In the method according to the present invention, at least one of the one or more tire building parameters is set, adjusted, configured, calibrated, validated and/or verified based on the test measurements M of the test strip T. In particular, the control unit 7 and/or the operator may decide, based on the test measurements M of the test strip T, to adjust or compensate for a measured difference in the test strip T between the expected results and the measured results. Moreover, one of the building parameters can be adjusted to compensate for a change in the test measurements M over time, e.g. as a result of curing. The test measurements M may also be used to predict the effects of die swell, i.e. the tendency of the test strip T to expand in cross section downstream of the die opening 24. In more advanced applications, the test measurements M may even be able to signal excessive wear of the extruder 21, the gear pump 22 and/or the die 23 by comparing the expected characteristics of the test strip T, e.g. volume or cross section, with the actual measured characteristics of the test strip T.

Hence, the test measurements M can be effectively used to predict the behavior of the production strip P, based ono the measured characteristics of the test strip T. The feedback that is provided by the test measurements M of the test strip T in the test mode TM can be used to set or adjust one or more of the building parameters accordingly and thereby prevent quality issues during the building of the tire component and/or improve the quality of the tire component during the production mode PM. The measurements can be used by an operator to set one or more of the building parameters manually. Alternatively, the measurements can be used as dataset for a machine-learning and/or artificial intelligence program to automatically adjust and/or control the building parameters and/or the production mode PM.

The test mode TM can be repeated before each building cycle of the production mode PM or—to save time—can be initiated only when switching over to a new batch or compound of raw material. The measurements from the test mode TM can be used to set the building parameters for repeatedly producing a single type of tire components or, if the amount of measurements is sufficient to predict a relatively large range of building parameters, it may be used to set the building parameters of different types of tire components without the need of re-running the test mode TM between a switch-over to a new type of tire component.

FIGS. 5-8 show an alternative tire building system 101 according to an exemplary second embodiment of the invention.

The alternative tire building system 101 differs from the previously discussed tire building system 1 in that it is provided with a measurement tool 103 separate or separable from the drum 4. The measurement tool 103 is arranged to fit around the cylindrical production surface 40 of the drum 4. The measurement tool 103 extends concentrically about the cylindrical production surface 40 when the measurement tool 103 is fitted around the cylindrical production surface 40. The measurement tool 103 forms a cylindrical measurement surface 130 outside of or at a greater diameter than the cylindrical production surface 40. Preferably, the outer diameter of the measurement tool 103 is only slightly larger than the outer diameter of the cylindrical production surface 40. The cylindrical measurement surface 130 is more circular than the cylindrical production surface 40. In particular, the cylindrical measurement surface 130, unlike the production surface 40 underneath, may form a perfect circle. Hence, the negative effects of gaps or slits between the segments 42 of the drum 4 can be prevented and the consistency, accuracy and/or reliability of test measurements M obtained from said perfect cylindrical measurement surface 130 can be improved. The cylindrical measurement surface 130 may also be optimized for measuring, e.g. by providing a greater contrast.

Figure 9:
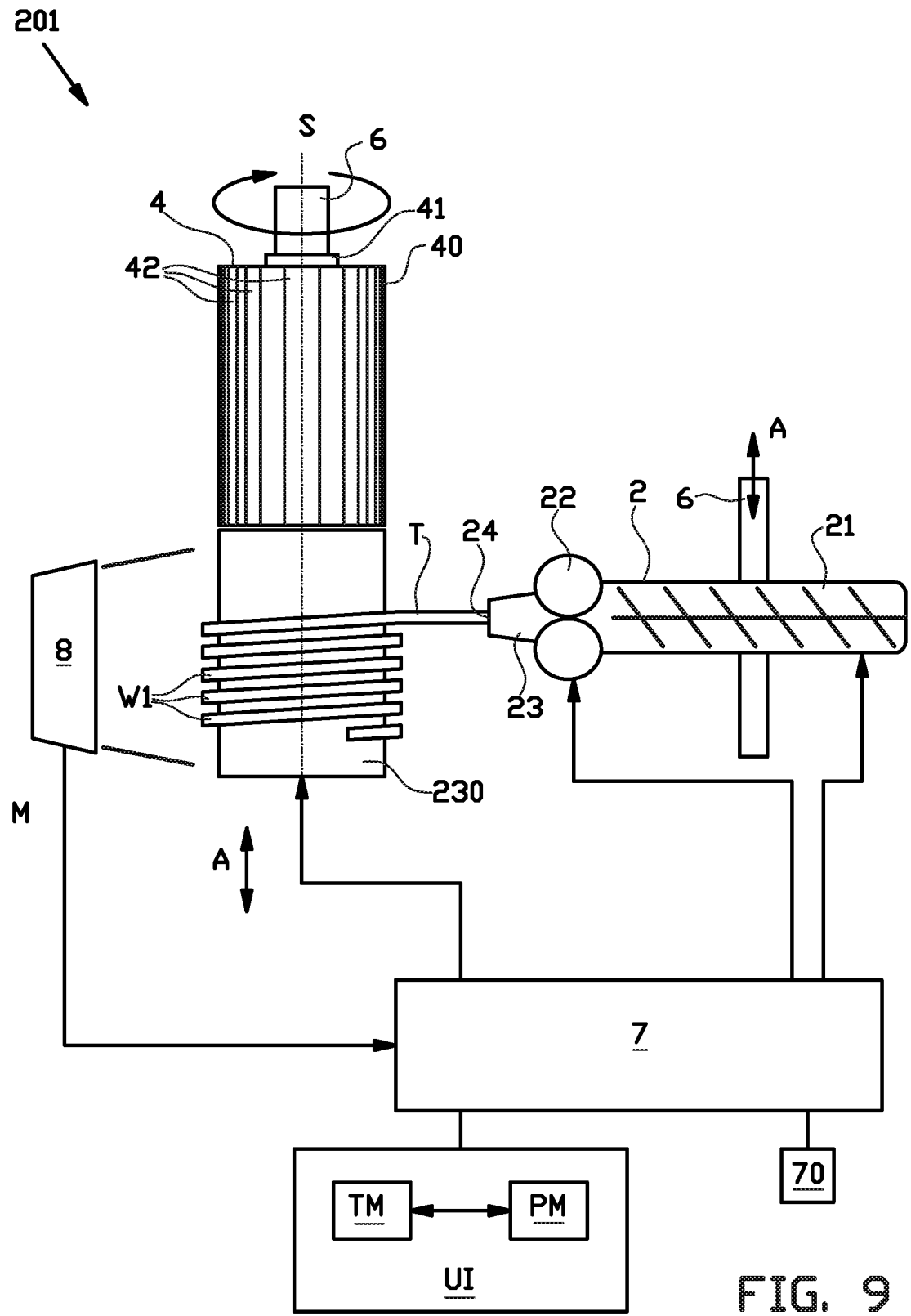
FIG. 9 shows a top view of a further alternative tire building system according to a third embodiment of the invention.

FIG. 9 shows a further alternative tire building system 201 according to an exemplary third embodiment of the invention. The further alternative tire building system 201 differs from the previously discussed tire building systems 1, 101 only in that it is provided with an alternative cylindrical measurement surface 230 that is offset with respect to the cylindrical production surface 40 in the axial direction A. In particular, the cylindrical measurement surface 230 may be provided on a separate portion of the drum 4 or at an extension or additional measurement drum alongside the drum 4 that forms the production surface 40.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

Although not explicitly shown, it will be clear to one skilled in the art that the test measurements obtained from the windings W of test strip T can also be used for predicting the behavior of the production strip P on a non-cylindrical production surface, e.g. a planar production surface or a conveyor.

LIST OF REFERENCE NUMERALS

1 tire building system
2 strip supply member
21 extruder
22 gear pump
23 die
24 die opening
30 cylindrical measurement surface
4 drum
40 cylindrical production surface
41 drum shaft
42 segments
5 rotational drive
6 pitch drive
7 control unit
70 memory
8 sensor
101 alternative tire building system
103 measurement tool
130 cylindrical measurement surface
201 further alternative tire building system
230 cylindrical measurement surface
A axial direction
D die width
E strip width
M measurements
P continuous production strip
PM production mode
K1 pitch of the test strip
K2 pitch of the production strip
S central axis
T continuous test strip
TM test mode
UI user interface
W1 windings of the test strip
W2 windings of the production strip

The invention claimed is:

1. A tire building method comprising the step of:
providing a choice to an operator via a user interface between a production mode for building a tire component and a test mode for obtaining test measurements, wherein the choice is provided prior to executing either the test mode or the production mode;
wherein the test mode is not intended to obtain a finished tire component and comprises the steps of:
providing a cylindrical measurement surface extending concentrically about a central axis;
helically winding a continuous test strip in a plurality of windings about said central axis onto the cylindrical measurement surface, wherein one or more windings of the plurality of windings of the test strip has a pitch in an axial direction parallel to the central axis that is greater than a width of the test strip in the same axial direction in said one or more windings; and
obtaining test measurements from at least one of the windings of the one or more windings of the test strip;
wherein the production mode comprises the step of:
building a tire component from a production strip, that is continuous from the test strip, on a production surface using one or more building parameters, wherein the production strip is wound using a first building parameter with a value that is set during the winding of the production strip according to a sequence of instructions for executing the production mode;
wherein, when the choice is made to execute the test mode prior to executing the production mode, the method further comprises the steps of first executing the test mode and then executing the production mode, wherein the test strip is wound using the first building parameter with a value that is set during the winding of the test strip according to a sequence of instructions for executing the test mode, wherein the sequence of instructions for executing the test mode is unrelated to and unrestricted by the production mode.

2. The tire building method according to claim 1, wherein the production strip is wound using the first building parameter with production values that all lie within a production value range, wherein the test strip is wound using the first building parameter with at least one test value that lies outside of the production value range.

3. The tire building method according to claim 1, wherein a first winding of the one or more windings of the test strip is at least partially wound using the first building parameter set at a first value and a second winding of the one or more windings of the test strip is at least partially wound using the first building parameter set at a second value different from the first value, wherein the method comprises the step of interpolating or extrapolating the test measurements of the test strip for values of the first building parameter in a range between the first value and the second value or outside of a range defined by the first value and the second value, respectively.

4. The tire building method according to claim 1, wherein the test strip obtained during the test mode is not used for building the tire component or a part thereof in the production mode.

5. The tire building method according to claim 1, wherein a first winding of the one or more windings of the test strip is at least partially wound using the first building parameter set at a first value and a second winding of the one or more windings of the test strip is at least partially wound using the first building parameter set at a second value different from the first value, wherein the first winding, the second winding, or both are at least partially wound using a second building parameter, different from the first building parameter, set at a third value, wherein a third winding of the one or more windings of the test strip is at least partially wound using the second building parameter set at a fourth value different from the third value.

6. The tire building method according to claim 1, wherein the first building parameter is kept constant for all windings of the plurality of windings of the test strip, wherein at least one of the one or more building parameters is adjusted in the production mode to compensate for a change in the test measurements over time.

7. The tire building method according to claim 1, wherein the one or more windings of the test strip includes an initial winding of the test strip onto the cylindrical measurement surface during a startup phase of the helical winding of the test strip or a last winding of the test strip on the cylindrical measurement surface during an end phase of the helical winding of the test strip, wherein the test measurements include measurements of a start of the initial winding onto the cylindrical measurement surface or a termination of the last winding on the cylindrical measurement surface, respectively.

8. The tire building method according to claim 1, wherein the plurality of windings are wound in a single layer around the cylindrical measurement surface, wherein the test mode is terminated after completing the single layer.

9. The tire building method according to claim 1, wherein the cylindrical measurement surface is the production surface, wherein the method comprises the step of removing the test strip from the measurement surface prior to the building of the tire component in the production mode.

10. The tire building method according to claim 9, wherein the tire component is built by helically winding the production strip in a plurality of windings onto the production surface.

11. The tire building method according to claim 10, wherein the plurality of windings of the production strip have a pitch in the axial direction that is smaller than the width of the production strip in the same axial direction.

12. The tire building method according to claim 11, wherein the pitch of the one or more windings of the test strip is at least one-and-a-half times greater than the largest pitch of the helical windings of the production strip.

13. The tire building method according to claim 1, wherein the production surface is a cylindrical production surface, wherein the method comprises the steps of fitting a measurement tool around the cylindrical production surface prior to the helical winding of the test strip and removing the measurement tool from the production surface after completion of the helical winding of the test strip and prior to the building of the tire component, wherein the cylindrical measurement surface is formed by the measurement tool and extends concentrically about the central axis when the measurement tool is fitted around the cylindrical production surface.

14. The tire building method according to claim 13, wherein the tire component is built by helically winding the production strip in a plurality of windings onto the production surface.

15. The tire building method according to claim 14, wherein the plurality of windings of the production strip have a pitch in the axial direction that is smaller than the width of the production strip in the same axial direction.

16. The tire building method according to claim 15, wherein the pitch of the one or more windings of the test strip is at least one-and-a-half times greater than the largest pitch of the helical windings of the production strip.

17. The tire building method according to claim 1, wherein the production surface is a cylindrical production surface, wherein the cylindrical measurement surface and the cylindrical production surface are offset with respect to each other in the axial direction.

18. The tire building method according to claim 17, wherein the tire component is built by helically winding the production strip in a plurality of windings onto the production surface.

19. The tire building method according to claim 18, wherein the plurality of windings of the production strip have a pitch in the axial direction that is smaller than the width of the production strip in the same axial direction.

20. The tire building method according to claim 19, wherein the test strip is wound helically, wherein the pitch of the one or more windings of the test strip is at least one-and-a-half times greater than the largest pitch of the helical windings of the production strip.

21. A tire building method comprising the step of:
providing a choice to an operator via a user interface between a production mode for building a tire component and a test mode for obtaining test measurements, wherein the choice is provided prior to executing either the test mode or the production mode;
wherein the test mode is not intended to approximate a target contour of a tire component and comprises the steps of:
providing a cylindrical measurement surface extending concentrically about a central axis;
helically winding a continuous test strip in a plurality of windings about said central axis onto the cylindrical measurement surface, wherein one or more windings of the plurality of windings of the test strip has a pitch in an axial direction parallel to the central axis that is greater than a width of the test strip in the same axial direction in said one or more windings; and
obtaining test measurements from at least one of the windings of the one or more windings of the test strip;
wherein the production mode comprises the step of:
building a tire component from a production strip, that is discontinuous from the test strip, on a production surface using one or more building parameters, wherein the production strip is wound using a first building parameter with a value that is set during the winding of the production strip according to a sequence of instructions for executing the production mode;
wherein, when the choice is made to execute the test mode prior to executing the production mode, the method further comprises the steps of first executing the test mode and then executing the production mode, wherein the test strip is wound using the first building parameter with a value that is set during the winding of the test strip according to a sequence of instructions for executing the test mode, wherein the sequence of instructions for executing the test mode is unrelated to and unrestricted by the production mode.

\* \* \* \* \*